(12) United States Patent
Kang et al.

(10) Patent No.: US 8,521,081 B2
(45) Date of Patent: Aug. 27, 2013

(54) REPEATING APPARATUS AND METHOD IN WIRELESS COMMUNICATION SYSTEM

(75) Inventors: Byung-Su Kang, Daejeon (KR); Heon-Kook Kwon, Daejeon (KR); Kwang-Chun Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 232 days.

(21) Appl. No.: 12/886,104

(22) Filed: Sep. 20, 2010

(65) Prior Publication Data
US 2011/0151775 A1    Jun. 23, 2011

(30) Foreign Application Priority Data
Dec. 21, 2009    (KR) .................. 10-2009-0128504

(51) Int. Cl.
*H04B 7/15*    (2006.01)
*H04B 7/185*    (2006.01)
*H04B 7/19*    (2006.01)

(52) U.S. Cl.
USPC .......... 455/10; 455/11.1; 455/13.1; 455/13.2; 455/13.3

(58) Field of Classification Search
USPC .............................. 455/11.1, 13.1, 13.2, 13.3
See application file for complete search history.

(56) References Cited

U.S. PATENT DOCUMENTS

| | | | | |
|---|---|---|---|---|
| 5,559,772 A * | 9/1996 | Takeda | | 369/44.36 |
| 7,480,485 B1 * | 1/2009 | Oh et al. | | 455/7 |
| 7,526,247 B2 * | 4/2009 | Baker et al. | | 455/11.1 |
| 7,764,924 B1 * | 7/2010 | Smithey et al. | | 455/7 |
| 7,888,947 B2 * | 2/2011 | Singleton et al. | | 324/555 |
| 7,924,751 B2 * | 4/2011 | Dean | | 370/279 |
| 8,208,877 B2 * | 6/2012 | Kahrizi et al. | | 455/127.2 |
| 2003/0123401 A1 * | 7/2003 | Dean | | 370/318 |
| 2004/0249258 A1 * | 12/2004 | Tupin et al. | | 600/407 |
| 2005/0208899 A1 * | 9/2005 | Hanabusa | | 455/69 |
| 2006/0071652 A1 * | 4/2006 | Miura | | 324/76.11 |
| 2007/0008889 A1 * | 1/2007 | Seo | | 370/232 |
| 2008/0175212 A1 * | 7/2008 | Angell et al. | | 370/338 |
| 2010/0120397 A1 * | 5/2010 | Kazmi et al. | | 455/410 |
| 2011/0028140 A1 * | 2/2011 | Dewasurendra et al. | | 455/422.1 |
| 2011/0211521 A1 * | 9/2011 | Baba et al. | | 370/315 |

FOREIGN PATENT DOCUMENTS

| | | |
|---|---|---|
| JP | 2005-184606 | 7/2005 |
| KR | 1992-0011099 | 6/1992 |
| KR | 10-2001-0045619 | 6/2001 |
| KR | 1020010060020 A | 7/2001 |
| KR | 102003049031 A | 6/2003 |
| KR | 1020050044538 A | 5/2005 |
| KR | 1020090063853 A | 6/2009 |

* cited by examiner

*Primary Examiner* — Bobbak Safaipour
(74) *Attorney, Agent, or Firm* — Kile Park Reed & Houtteman PLLC

(57) ABSTRACT

A repeating apparatus in a wireless communication system includes: a signal detection unit configured to receive a signal from a base station or a mobile station and detect strength of the signal; a control unit configured to compare the signal strength detected by the signal detection unit with signal strength predetermined by the system and provide comparison information; and an output signal control unit configured to receive the comparison information from the control unit and adjust and amplify gain of a signal transmitted to the base station or the mobile station.

13 Claims, 4 Drawing Sheets

REPEATING APPARATUS AND METHOD IN WIRELESS COMMUNICATION SYSTEM

CROSS-REFERENCE(S) TO RELATED APPLICATIONS

The present application claims priority of Korean Patent Application No. 10-2009-0128504, filed on Dec. 21, 2009, which is incorporated herein by reference in its entirety.

BACKGROUND OF THE INVENTION

1. Field of the Invention

Exemplary embodiments of the present invention relate to a repeating apparatus and method in a wireless communication system; and, more particularly, to an apparatus and method for determining output based on signals inputted/outputted to a repeater in a wireless communication system.

2. Description of Related Art

A repeater refers to a device for transmitting RF signals from a base station to a remote region in various methods so that the RF signals are regenerated. Base station antennas are installed at the local cell center only, and radio waves from the base station cannot reach some areas (dead zones). The repeater is basically configured to amplify radio waves from the base station and retransmit them to dead zones. Therefore, although the base station is in charge of basic signal processing, the repeater also has a large influence on communication quality because of its role of covering dead zones.

Repeaters include optical repeaters for supporting optical fiber, which is widely used for higher data speed recently, microwave repeaters for transmission in microwave frequency bands, ultra-small repeaters for covering small dead zones, indoor repeaters for supporting indoor home networks, etc.

However, conventional repeaters are simply configured to amplify and retransmit signals, making unnecessary power consumption unavoidable. Furthermore, conventional repeaters have no information regarding the signal-to-noise ratio, which is needed by mobile stations to receive a specific service, and thus have to maintain a power level higher than is necessary to provide the service, which is inefficient. Therefore, there is a need for a standard for signal detection by repeaters and a method for reducing unnecessary power consumption by accurately estimating the signal-to-noise ratio based on information exchange between mobile stations and base stations.

SUMMARY OF THE INVENTION

An embodiment of the present invention is directed to a repeating apparatus and method which can reduce power consumption.

Another embodiment of the present invention is directed to a repeating apparatus and method which can flexibly cope with the network situation.

Another embodiment of the present invention is directed to a repeating apparatus and method which can be implemented easily.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with an embodiment of the present invention, a repeating apparatus in a wireless communication system includes: a signal detection unit configured to receive a signal from a base station or a mobile station and detect strength of the signal; a control unit configured to compare the signal strength detected by the signal detection unit with signal strength predetermined by the system and provide comparison information; and an output signal control unit configured to receive the comparison information from the control unit and adjust and amplify gain of a signal transmitted to the base station or the mobile station.

In accordance with another embodiment of the present invention, a repeating method in a mobile communication system includes: receiving a signal of an uplink or downlink and detecting strength of the signal; comparing the detected signal strength with predetermined signal strength provided by the system; and suspending transmission of the received signal to the uplink or downlink when the detected signal strength is smaller than the predetermined signal strength and waiting for a signal to be received, detected strength of the signal being larger than the predetermined signal strength.

In accordance with another embodiment of the present invention, an apparatus for generating a repeater control signal by a mobile station in a mobile communication system includes: a detector configured to receive a signal from the repeater and detect a received SNR value; a reference value storage unit configured to store a requested SNR value requested by the system and a margin value; a comparator configured to compare the received SNR value with a sum of the requested SNR value and the margin value and provide comparison information; and a signal bit adding unit configured to add a predetermined first or second bit to a pilot channel based on the comparison information.

In accordance with another embodiment of the present invention, a method for generating a repeater control signal by a mobile station in a mobile communication system includes: receiving a signal from the repeater and detecting a received SNR value; comparing the received SNR value with a sum of a requested SNR value and a margin value and providing comparison information; and adding a predetermined first or second bit to a pilot channel based on the comparison information.

DESCRIPTION OF SPECIFIC EMBODIMENTS

Figure 1:
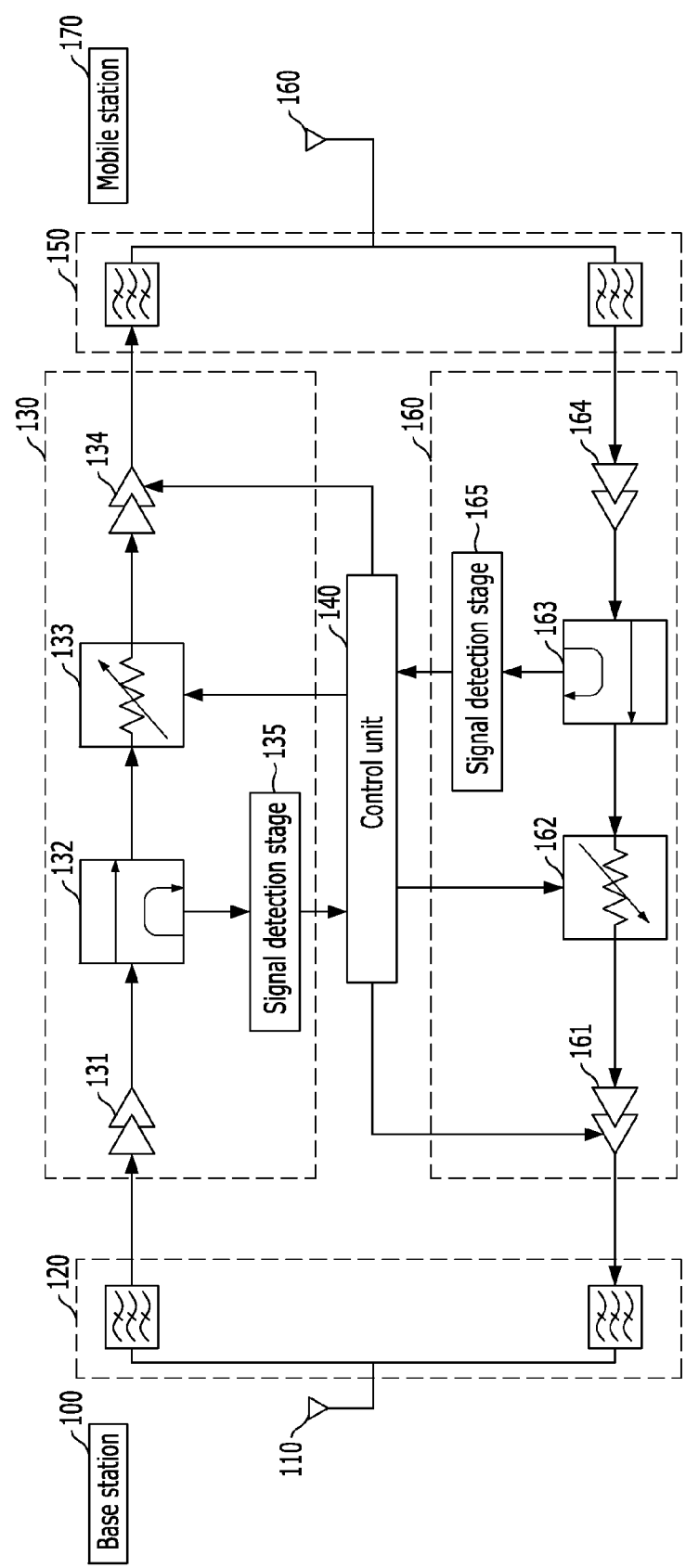
FIG. 1 illustrates the construction of a repeater in accordance with an embodiment of the present invention.

Exemplary embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

FIG. 1 illustrates the construction of a repeater in accordance with an embodiment of the present invention.

Referring to FIG. 1, the repeater includes input/output antennas 110 and 160 configured to receive or transmit signals to a base station 100 or a mobile station 170, input/output stages 120 and 150 configured to receive signals from the input/output antennas and separate the transmitted/received signals, low-noise amplifiers 131 and 164, couplers 132 and 163, signal detection stages 135 and 165, gain adjustment stages 133 and 162, output amplification stages 134 and 161, and a control unit 140. The low-noise amplifiers 131 and 162, the couplers 132 and 163, and the signal detection stages 135 and 165 will, as a whole, be referred to as a signal detection unit, and the gain adjustment stages 133 and 162 and the output amplification stages 134 and 161 will, as a whole, be referred to as an output signal control unit.

The operating process of the repeater in accordance with the present invention will be described with reference to FIG. 1. In FIG. 1, reference numeral 130 refers to transfers to the downlink, i.e. transfer from the base station 100 to the mobile station 170, and reference numeral 160 refers to transfer to the uplink, i.e. transfer from the mobile station 170 to the base station 100. The transfers from the repeater to the uplink and downlink are symmetrically configured, so the following description will be made with reference to the downlink transfer. The input/output antenna 110 receives a signal from the base station 100 and transfers the signal to the input/output stage 120. The input/output stage 120 transfers the signal from the input/output antenna 120 to the low-noise amplifier 131. The low-noise amplifier 131 amplifies the received weak signal and transfers the amplified signal to the coupler 132. The coupler 132 couples the signal received from the low-noise amplifier 131 and transfers the coupled signal to the gain adjustment stage 133 and the signal detection stage 135. The signal detection stage 135 detects the strength of the signal from the coupler 132 and transfers the resulting information to the control unit 140.

The control unit 140 compares the signal strength detected by the signal detection stage 135 with predetermined signal strength and, when the detected signal strength is below a predetermined threshold, interrupts the output amplification stage to suspend signal transmission. When the detected signal strength is above the predetermined threshold, the control unit 140 transfers control information to the gain adjustment stage 133 and the output amplification stage 134 to output the signal. Based on the signal received from the coupler 132 and the control signal from the control unit 140, the gain adjustment stage 133 reflects automatic gain to the signal and transfers the signal to the output amplification stage 134. The output amplification stage 134 amplifies the signal from the gain adjustment stage 133 and transfers the amplified signal to the input/output stage 150. The input/output stage 150 transfers the signal from the output amplification stage 134 to the input/output antenna 160, which transmits the signal to the mobile station. The same procedure applies to the path to the uplink (from the mobile station to the base station), and the condition is maintained until the strength of an inputted signal is sufficient for communication.

Furthermore, in accordance with the present invention, the quality of a signal is measured by the mobile station to adjust the downlink signal strength to a suitable level. Specifically, a predetermined control signal, which is used to control the repeater downlink gain adjustment stage 133, is inserted into the pilot channel of an uplink signal transmitted from the mobile station to the base station. In order to avoid unnecessary increase in the amount of data, 1-bit signal is used to indicate only the increase or decrease of the gain value.

Figure 2:
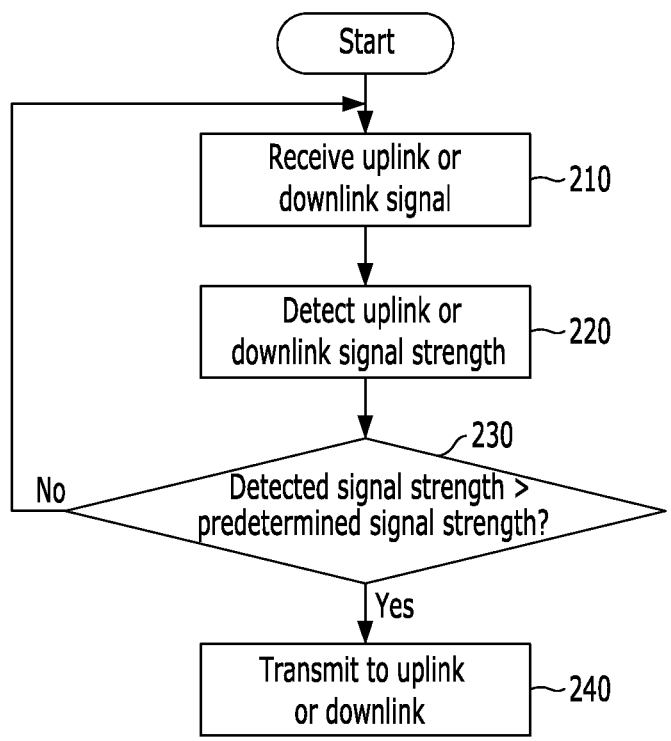
FIG. 2 is a flowchart illustrating a repeating method in accordance with an embodiment of the present invention.

FIG. 2 is a flowchart illustrating a repeating method in accordance with an embodiment of the present invention.

A repeating method in accordance with an embodiment of the present invention will be described with reference to FIG. 2. The following description with reference to FIG. 2 will also be based on the downlink from the base station 100 to the mobile station 170. The input/output antenna 110 receives a signal from the base station 100 at step S210. The signal detection stage determines the downlink signal strength at step S220. The control unit 140 compares the signal strength determined by the signal detection stage with signal strength predetermined by the system at step S230. When it is confirmed at the step S230 that the signal strength determined by the signal detection stage is smaller than the predetermined signal strength, the control unit 140 interrupts the output amplification stage 134 to suspend signal transmission and continues to receive signals. When it is confirmed that the detected signal strength is larger than the predetermined signal strength, the control unit 140 transmits the signal to the downlink using a control signal at step S240.

Figure 3:
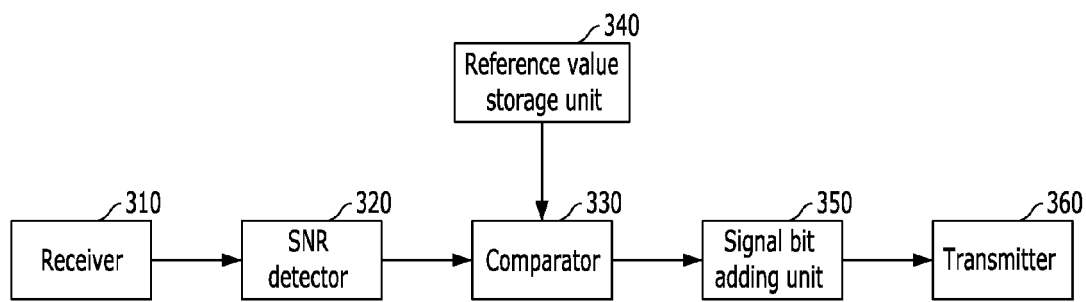
FIG. 3 illustrates the construction of an apparatus for generating a repeater control signal by a mobile station in accordance with another embodiment of the present invention.

FIG. 3 illustrates the construction of an apparatus for generating a repeater control signal by a mobile station in accordance with another embodiment of the present invention.

Referring to FIG. 3, the apparatus includes a receiver 310 configured to receive downlink data, a SNR detector 320 configured to detect the Signal-to-Noise Ratio (SNR) using a received signal, a reference value storage unit 340 configured to store a SNR value of a signal received by the mobile station, which is requested by the system, and a margin value, a comparator 330 configured to compare the detected SNR with the value stored in the reference value storage unit 340, a signal bit adding unit 350 configured to add a signal bit based on the result from the comparator, and a transmitter 360 configured to transmit data to the repeater.

Operation of the apparatus for generating a repeater control signal by a mobile station will be described with reference to FIG. 3. The receiver 310 receives a signal from the repeater and transfers the signal to the SNR detector 320. The SNR detector 320 detects the SNR of the signal from the receiver and transfers the SNR to the comparator. The comparator 330 compares the SNR of the received signal, which has been transferred by the SNR detector 320, with the sum of a SNR value (which is requested by the system) and a margin value (which corresponds to variance of the SNR value), which are provided by the reference value storage unit 340, and transfers the result of comparison to the signal bit adding unit 350. Based on the information from the comparator 330, the signal bit adding unit 350 adds a bit for controlling signal output from the repeater to the mobile station and transfers the data to the transmitter 360. The transmitter 360 transfers the data from the signal bit adding unit 350 to the repeater.

The reference value storage unit 340 of the mobile station is supposed to store SNR, which is requested in connected with the currently provided communication service, and a suitable level of margin value. The comparator 330 compares the received/measured SNR with the sum of requested SNR and the margin value, adds an increase/decrease signal to the uplink pilot channel, and transmits it.

Figure 4:
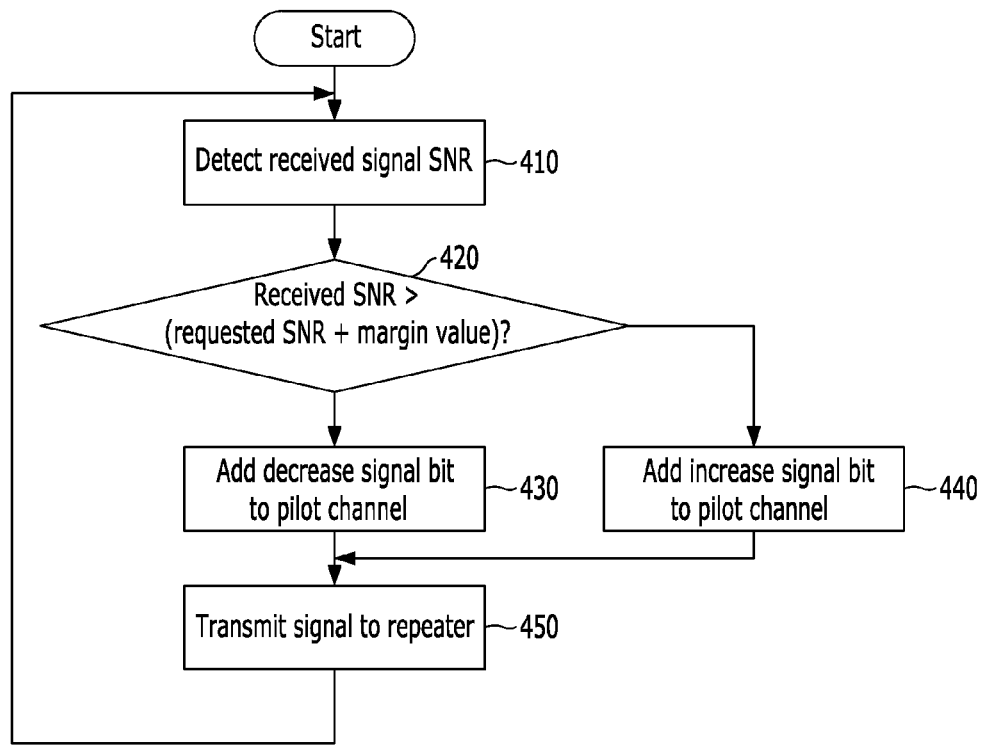
FIG. 4 is a flowchart illustrating a method for generating a repeater control signal by a mobile station in accordance with another embodiment of the present invention.

FIG. 4 is a flowchart illustrating a method for generating a repeater control signal by a mobile station in accordance with another embodiment of the present invention.

The SNR detector 320 detects the SNR of a received signal at step S410. The comparator 330 compares the SNR of the received signal, which has been detected by the SNR detector 320, with the sum of a requested SNR value and a margin value provided by the reference value storage unit 340 at step S420. When it is confirmed at the step S420 that the received SNR value is larger, the signal bit adding unit 350 adds a decrease signal bit to the pilot signal at step 430, and the transmitter 360 transmits the signal to the repeater at step S450. When it is confirmed that the sum of the requested SNR value and the margin value is larger, the signal bit adding unit 350 adds an increase signal bit to the pilot channel at step S440, and the transmitter 360 transmits the signal to the repeater at step S450.

The present invention confirms whether a signal is inputted or not and determines operation of the output stage amplifier so that unnecessary power consumption is reduced. Unnecessary signal radiation is fundamentally prevented to reduce the degree of interference with other services using adjacent bands.

In addition, gain of the repeater downlink stage is adjusted based on the downlink signal strength measured by the mobile station, and a signal of a proper level of strength is transmitted to the mobile station. This minimizes nonlinear distortion resulting from the limited performance of the output stage amplifier.

In accordance with the exemplary embodiments of the present invention, the repeating apparatus and method can reduce power consumption and flexibly cope with the network situation, and are easy to implement.

While the present invention has been described with respect to the specific embodiments, it will be apparent to those skilled in the art that various changes and modifications may be made without departing from the spirit and scope of the invention as defined in the following claims.

What is claimed is:

1. A repeating apparatus in a wireless communication system, comprising:
   a signal detection unit configured to receive a signal from a base station or a mobile station and detect strength of the signal;
   a control unit configured to compare the signal strength detected by the signal detection unit with signal strength predetermined by the system and provide comparison information; and
   an output signal control unit configured to receive the comparison information from the control unit and adjust and amplify gain of a signal transmitted to the base station or the mobile station,
   wherein, after the repeating apparatus receives a control signal from a pilot channel of an uplink signal transmitted from the mobile station, the output signal control unit:
      adjusts, based on the control signal, a second gain for a second signal to be transmitted to the mobile station; and
      amplifies the second signal by the adjusted second gain.

2. The repeating apparatus of claim 1, further comprising:
   an input/output antenna configured to receive a signal from the base station or the mobile station; and
   an input/output stage configured to receive the signal from the input/output antenna and identify a transmitted/received signal.

3. The repeating apparatus of claim 1, wherein the signal detection unit comprises:
   a low-noise amplifier configured to amplify the received signal;
   a coupler configured to couple output of the amplifier to the output signal control unit and to a signal detection stage; and
   the signal detection stage configured to receive the output from the coupler and detect signal strength.

4. The repeating apparatus of claim 1, wherein the output signal control unit comprises:
   a gain controller configured to receive a control signal of the control unit and a signal received by a coupler and perform automatic gain control; and
   an output amplification stage configured to amplify the signal, the gain of the signal having been controlled by the gain controller, into a signal transmitted to the base station or the mobile station.

5. The repeating apparatus of claim 1, wherein the control unit is configured to interrupt the output signal control unit when the received signal strength is smaller than the predetermined signal strength.

6. The repeating apparatus of claim 1, wherein the control unit is configured not to interrupt the output signal control unit when the received signal strength is larger than the predetermined signal strength.

7. A repeating method in a mobile communication system, comprising:
   receiving a signal of an uplink or downlink and detecting strength of the signal;
   comparing the detected signal strength with predetermined signal strength provided by the system; and
   suspending transmission of the received signal to the uplink or downlink when the detected signal strength is smaller than the predetermined signal strength and waiting for a signal to be received, detected strength of the signal being larger than the predetermined signal strength,
   wherein, after receiving a control signal from a pilot channel of an uplink signal transmitted from a mobile station, the method further comprises:
      adjusting, based on the control signal, a gain for a second signal to be transmitted to the mobile station; and
      amplifying the second signal by the adjusted gain.

8. The repeating method of claim 7, further comprising transmitting the received signal to the uplink or the downlink when the detected signal strength is larger than the predetermined signal strength.

9. The repeating apparatus of claim 1, wherein the control signal is an increase control signal that prompts the output signal control unit to increase the second gain for the second signal.

10. The repeating apparatus of claim 9, wherein the increase control signal is a 1-bit signal, and wherein the 1 bit indicates the amount of increase for the second gain.

11. The repeating apparatus of claim 1, wherein the control signal is a decrease control signal that prompts the output signal control unit to decrease the second gain for the second signal.

12. The repeating apparatus of claim 11, wherein the decrease control signal is a 1-bit signal, and wherein the 1 bit indicates the amount of decrease for the second gain.

13. The repeating method of claim 7, wherein the control signal is a 1-bit signal, and wherein the 1 bit indicates the amount of increase or decrease for the gain.

* * * * *